(No Model.)

W. D. SLOAN.
WIRE NAIL.

No. 276,541.     Patented Apr. 24, 1883.

Witnesses
Rudolf Kjellman
Thomas E. Crossman

Inventor
William D. Sloan
by James A. Whitney
Attorney

UNITED STATES PATENT OFFICE.

WILLIAM D. SLOAN, OF BROOKLYN, NEW YORK, ASSIGNOR TO GEORGE L. CLARK, OF SAME PLACE.

WIRE NAIL.

SPECIFICATION forming part of Letters Patent No. 276,541, dated April 24, 1883.

Application filed July 10, 1882. (No model.)

*To all whom it may concern:*

Be it known that I, WILLIAM D. SLOAN, of Brooklyn, in the county of Kings and State of New York, have invented certain Improvements in Wire Nails, of which the following is a specification.

This invention comprises a novel construction of a wire nail, whereby the retention of the nail in place when applied to use is very greatly promoted and increased.

Figure 1 is a side view on an enlarged scale, and Fig. 2 a transverse sectional view on a similar scale, of a wire nail made according to my invention.

A is the shank of the nail, furnished with a head, B, and having the usual cylindrical form substantially without taper, except at the extreme end, which is pointed, as shown at *a*. That portion of the circumferential surface of the shank A adjacent to the pointed end thereof, and for a distance from said pointed end—say one-third (more or less) of the total length of the shank—is formed with superficial spiral grooves *c*. Shown in cross-section in Fig. 2.) These grooves may have, say, a three-quarters turn or twist; but this may be varied within wide limits. The grooves may be formed in the said portion of the shank by any suitable mechanical treatment or manipulation. The outer ends of the grooves terminate at the slope of the point *a*, so that when the nail is driven into its place the said ends are open to permit access lengthwise thereof of the inwardly pressed or projecting portions of the wood brought in contact with the surface of nail.

The nail is to be used for all the ordinary purposes of the well-known wire nail—such, for example, as the making of boxes of thin wood or stuff, and for analogous uses. When driven home to its place the wood or material into which it is driven crowds into the spiral grooves, the nail slowly turning on its axis to permit the easy driving of said nail, the wood also crowding, when the nail is driven sufficiently deep, upon the plain cylindrical portion of the shank A, between the grooved portion and the head. The plain and grooved portions exert a frictional hold upon the wood, the former by the contact of its plain surface, the latter by the multiplied gripping of its grooved surfaces, and the two together insuring a firm retention of the nail in place, which greatly exceeds in tenacity and strength the holding capacity of the ordinary smooth-surface wire nail.

It will be observed that the pitch of the spiral grooves is such that they approach much nearer a position longitudinal with the shank A than one at right angles or substantially at right angles thereto, and in this respect differs very materially from that of an ordinary screw.

What I claim as my invention is—

1. A cylindrical wire nail having a suitable head and point, and with its portion adjacent to the said point roughened or corrugated to afford additional holding-surface when the nail is driven, substantially as set forth.

2. A cylindrical wire nail having a suitable head and point, and with a portion of its length adjacent to the point grooved spirally, substantially as set forth, for the purpose specified.

WILLIAM D. SLOAN.

Witnesses:
DANFORTH BECKER,
THOMAS E. CROSSMAN.